United States Patent [19]

Fukui

[11] 4,447,154
[45] May 8, 1984

[54] METHOD FOR DETECTING FOCUS OF IMAGE

[75] Inventor: Takashi Fukui, Minami-ashigara, Japan

[73] Assignee: Fuji Photo Film Co., Ltd., Minami-ashigara, Japan

[21] Appl. No.: 275,286

[22] Filed: Jun. 19, 1981

[30] Foreign Application Priority Data

Jun. 20, 1980 [JP] Japan .................................. 55-83663

[51] Int. Cl.³ .............................................. G01J 3/46
[52] U.S. Cl. ................................................... 356/404
[58] Field of Search ........................ 356/404, 406, 407

[56] References Cited

U.S. PATENT DOCUMENTS 4,203,671  5/1980  Takahashi et al. .................. 356/402

Primary Examiner—F. L. Evans

[57] ABSTRACT

The focus of a picture image on a color film is evaluated by dividing the picture image into minute picture elements, detecting those portions of the picture image which are of flesh color from the separated color transmission factor or the color density of the picture elements, and using the information obtained regarding the flesh color portions to detect whether or not the picture image is out of focus.

2 Claims, 1 Drawing Figure

U.S. Patent
May 8, 1984
4,447,154
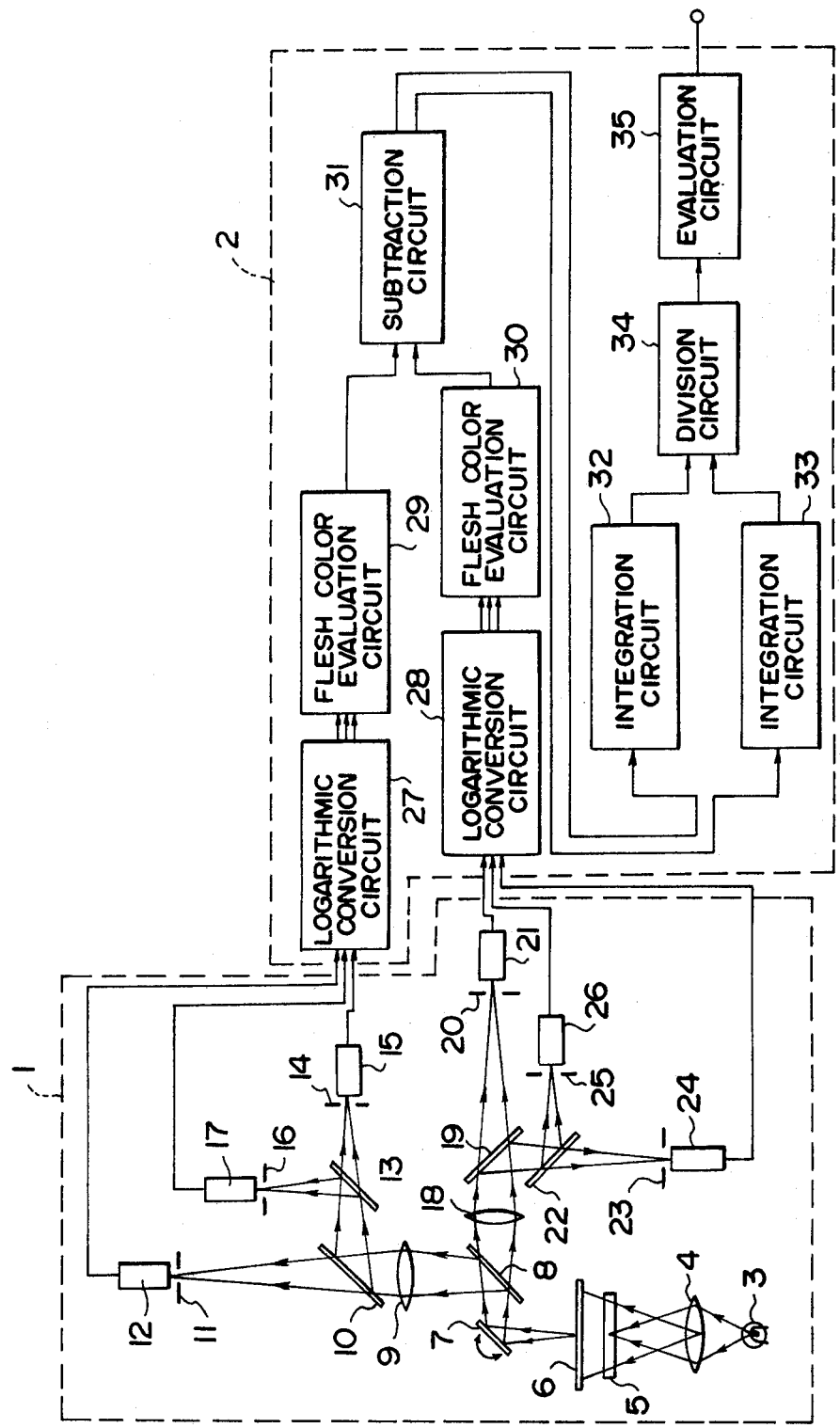

METHOD FOR DETECTING FOCUS OF IMAGE

BACKGROUND OF THE INVENTION

1. Field of the Invention

This invention relates a method for detecting focus of an image, namely for detecting whether or not a picture image recorded on a recording medium is out of focus and more particularly to a method for detecting whether or not the picture image recorded on a photographic color film is out of focus.

2. Description of the Prior Art

In the printing of pictures taken by amateur photographers, it is necessary to eliminate those photographs which are so improperly exposed as to make compensatory correction in the printing process impossible and those photographs which are out of focus. This is particularly true in the case of the printing of color photographs both because of the high price of the photographic materials used and because of the need to conserve natural resources.

There are already in use a number of general methods for detecting whether or not a picture image is out of focus. One of these methods subjects the picture image recorded on the photographic film to Fourier transformation to obtain information regarding the spatial frequency region of the picture image and determines whether or not the picture image is out of focus on the basis of this information. Another determines whether or not the picture image is out of focus from the ratio between the maximum density gradient of the whole picture image, which is obtained from the density values of picture elements (meaning minute portions into which the image is divided beforehand), and the maximum density gradient for the part of the picture image remaining after elimination of the high spatial frequency region (see U.S. Pat. No. 4,379,632). Still another is the method employing a blur mask proposed in U.S. Pat. application Ser. No. 251,099 filed Apr. 6, 1981.

A given photographic image almost always includes objects that were at various distances from the camera at the time the photograph was taken. For this reason, photographs in which all objects in the picture image are in focus are exceedingly rare. Therefore, if the main object of the photograph is in focus, the picture image can be said to have good clarity even though the other objects included therein are out of focus. With the conventional methods such as those mentioned above, however, the judgment as to focus is made on the basis of information concerning the whole picture image and, therefore, even a photograph whose subject is in good focus will be judged to be out of focus if other objects in the photograph are out of focus.

SUMMARY OF THE INVENTION

The object of this invention is to overcome the defects inherent in conventional methods of judging the quality of the focus of picture images by providing a method for detecting whether a picture image is out of focus on the basis of the subject of the photograph only.

Most photographs taken by amateur photographers include at least one human figure and in such photographs the person's face is nearly always the most important part of the picture. Therefore, when the portion of the photograph including the face is clear, it is possible without any practical disadvantage to judge that the picture image on the picture film is in focus.

As such photographs including a human figure have the common feature of including flesh color, the subject of the photograph can be easily located regardless of where it is positioned within the picture image merely by detecting the position of the flesh color part. Then by determining whether the picture image within the flesh color region has good clarity, it is possible to judge whether or not the subject of the photgraph is out of focus.

As the method for detecting flesh color there can be used that described in U.S. Pat. No. 4,203,671. In this method, the blue, green and red densities for points in the picture image on the photographic film are obtained photometrically and when the densities for any given point are found to fall within an ellipse or a solid figure having an elliptical cross section defined as being the region of flesh color in a two- or three-coordinate system wherein each coordinate represents blue, green, red or a combination of these, the point concerned is judged as having flesh color.

Although this method does not permit the indentification of flesh color even when the picture includes a human face, arm, leg, etc. insofar as the size of the flesh color portion is smaller than the measurement area (ordinarily 1 mm in diameter for a picture image on color film and 3 mm in diameter for a picture image on a color print), it is capable of distinguishing between flesh color portions and other portions with high accuracy in any case where the face etc. covers an area larger than the measurement area.

This means that the judgment as to the presence of flesh color relates only to flesh color areas which are larger than the measurement area and it is with respect to only such areas that the aforesaid method for detecting whether a picture image is out of focus is applied.

It is of course possible for a photograph to contain no flesh color portion. In such cases, it is preferable to make the judgment concerning focus quality solely on the basis of the center portion of the picture image.

The other objects and features of the invention will be clear from the following detailed explanation made in reference to the attached drawing.

BRIEF DESCRIPTION OF THE DRAWING

The sole FIGURE is a block diagram illustrating a device for carrying out one embodiment of the present invention.

DESCRIPTION OF PREFERRED EMBODIMENT

The device for detecting out-of-focus picture images comprises a photometric section 1 housed in a dark box and an evaluation section 2 for judging the quality of the picture image focus on the basis of measurement signals input from the photometric section 1.

Illuminating light emitted from a light source 3 in the photometric section 1 is focused on a cylindrical lens 5 by a lens 4. The cylindrical lens 5 focuses this light on the surface of a photographic color film (for example, a color negative film; hereinafter referred to simply as "film") as a thin, line-shaped beam. The size of the resulting illuminated band of the film 6 is preferably about 25 mm in the lateral direction of the drawing (in the direction in which the cylindrical lens 5 has no focusing effect) and about 1 mm in the focusing direction of the cylindrical lens 5.

The light passing through the film 6 impinges on a galvanometer mirror 7 which swings as indicated by an arrow so as to scan the film 6. Since the film 6 is simultaneously transported in the direction normal to the plane of the figure, it is as a consequence scanned two-dimensionally.

The light reflected by the galvanometer mirror 7 passes to a half-mirror 8 where it is divided into a transmitted beam and a reflected beam. The reflected beam passes through a lens 9 to a dichroic mirror 10 which separates it into red light and cyan light. The red light passes through a mask 11 with a small aperture and enters a photoreceptor for red light 12. On the other hand, the cyan light reflected by the dichroic mirror 10 passes to a dichroic mirror 13 where it is separated into blue light and green light. The green light passes through a mask 14 having an aperture of the same size as that of the mask 11 and enters a photoreceptor for blue light 15. The green light passes through a mask 16 with the same sized aperture and enters a photoreceptor for green light 17. Here the arrangement of the lens 9 is such that if the apertures of the masks 11, 14 and 16 should be projected onto the film 6, the area of their images on the film surface (the measurement area) would be approximately 0.3 mm square each.

The light transmitted through the half mirror 8 passes through a lens 18 to a dichroic mirror 19. The red light separated by the dichroic mirror 19 passes through a mask 20 with a large aperture and enters a photoreceptor for red light 21. The cyan light is separated into blue light and green light by a dichroic mirror 22. The blue light passes through a mask 23 into a photoreceptor for blue light 24 and the green light passes through a mask 25 into a photoreceptor for green light 26. The apertures of the masks 23 and 25 are of the same size as that of mask 20. The lens 18 is arranged so that the areas of the apertures of the masks 20, 23 and 25 on the film surface are each 1 mm square.

Thus, by using masks having two different sizes of apertures, the measurement is made using different sized measurement areas on the film 6. Because of this, clear picture image signals are obtained from the photoreceptors for red, blue and green light 12, 15 and 17 provided with the masks 11, 14 and 16 which have small apertures, whereas fuzzy picture image signals are obtained from the photoreceptors for red, blue and green light 21, 24 and 26 provided with the masks 20, 23 and 25 which have large apertures.

The two sets of three-color signals obtained in this way for the same location on the film 6 but for different measurement areas are fed one to each of two logarithmic conversion circuits 27 and 28 which convert them into the corresponding red, green and blue density signals. The two sets of three-color density signals are fed one to each of two flesh color evaluation circuits 29 and 30 which evaluate the signals from the respective systems as to whether they represent flesh color. Alternatively, it is also possible to provide a flesh color evaluation circuit only for the system having the large aperture masks and to use the evaluation signal from this circuit to turn ON and OFF an analog gate incorporated in the system having the small aperture masks. The flesh color evaluation circuits 29 and 30 are described in detail in the U.S. Pat. No. 4,203,671.

When it is judged by the flesh color evaluation circuits 29 and 30 that the portion of the picture image under evaluation is of flesh color, flesh color information for that portion, namely the sums of the three color density signals of the respective systems for the portion concerned, is inputted to a subtraction circuit 31 which calculates the difference $\Delta D$ between the flesh color density values of the two systems.

Although the density difference $\Delta D$ varies over a wide range, the range of variation is wider in the case that the picture image recorded on the film is clear than in the case that it is out of focus. Thus, when density difference $\Delta D$ falls within a certain range it is integrated by an integration circuit 32 and when it falls outside this range it is integrated by an integration circuit 33. The integrated values are inputted to a division circuit 34 which calculates the ratio between them. The ratio found is forwarded to an evaluation circuit 35. Generally speaking, this ratio differs greatly between a picture image which is clear and one which is out of focus so that by checking whether the ratio is smaller than a certain value it is possible to distinguish between picture images which are out of focus and those which are not.

For example, the apertures of one system are made 1 mm square and those of the other are made 3 mm square and density differences wherein $|\Delta D| \leq 0.15$ are integrated by the integration circuit 32 while density differences wherein $|\Delta D| > 0.15$ are integrated by the integration circuit 33. The value obtained by the latter of these integrations is then divided by the value obtained in the former. In the case of a picture image which is out of focus, this ratio will be exceedingly small, on the order of 0.001. On the other hand, in the case of a picture image with high clarity it will be much larger, on the order of 0.2 or 0.4. Therefore, it is possible to detect whether or not a given picture image is out of focus from whether or not this ratio exceeds a given value.

Although the so-called "blue-mask" method is employed by way of example in the embodiment of the invention described above, the present invention can, as mentioned earlier, also make use of various other methods for the detection of out-of-focus picture images. Regardless of the method employed, however, use is always made of information regarding the flesh color portions.

It should be noted also that the device used for carrying out the method of this invention can be made more compact if CCDs or other type solid state imaging elements are used as the photoreceptors.

As described above, in accordance with the present invention, the picture image on a photographic color film is divided into minute picture elements and the portions of the picture image which are of flesh color are detected from the separated color transmission factor or the color density of these picture elements, whereafter the quality of the focus of the picture image is evaluated using the signals corresponding to the measured values for these portions. As a consequence, in the evaluation of amateur photographs, a high percentage of which are known to include one or more human figures, it is possible to judge with a high degree of accuracy that a picture image has good clarity from the fact that the human figure (particularly the face) therein is in good focus. As a result, there is achieved a remarkable improvement in the accuracy of detection of picture images which are out of focus.

I claim:

1. A method for detecting whether a picture image recorded on a color recording medium is out of focus comprising the steps of: dividing the picture image into minute picture elements, detecting which portions of the picture image are of flesh color by separating the picture elements according to color transmission factor or color density of the picture elements, and detecting whether or not the picture image is out of focus from measurements on the flesh color portions.

2. A method according to claim 1 wherein the separated color transmission factor or the color density of the picture image is detected through two types of blur masks having different sized apertures.

* * * * *